United States Patent [19]

Harris

[11] 4,282,764

[45] Aug. 11, 1981

[54] ROTARY TO LINEAR ACTUATOR AND METHOD OF MAKING THE SAME

[75] Inventor: Bernard Harris, Bayside, Wis.

[73] Assignee: Rexnord Inc., Milwaukee, Wis.

[21] Appl. No.: 75,930

[22] Filed: Sep. 17, 1979

[51] Int. Cl.³ .......................... F16H 1/18; B65H 81/00
[52] U.S. Cl. .............................. 74/89.15; 74/424.8 R; 156/173; 308/238
[58] Field of Search ....... 74/89.15, 424.8 R, DIG. 10; 308/DIG. 7, DIG. 8, 238, 241; 156/173, 161, 192

[56] References Cited

U.S. PATENT DOCUMENTS

| 2,053,418 | 9/1960 | Runton et al. | 308/238 |
|---|---|---|---|
| 3,572,392 | 3/1971 | McLarty | 138/109 |
| 3,616,000 | 10/1971 | Butzow et al. | 156/173 |
| 3,692,375 | 9/1972 | Matt et al. | 308/238 |
| 3,700,295 | 10/1972 | Butzow et al. | 308/238 X |
| 3,713,932 | 1/1973 | Butzow et al. | 156/173 |
| 3,804,479 | 4/1974 | Butzow et al. | 308/238 |
| 3,974,009 | 8/1976 | Butzow et al. | 308/238 X |
| 4,040,883 | 8/1977 | Matt et al. | 308/238 |
| 4,054,337 | 10/1977 | Matt et al. | 308/DIG. 8 |
| 4,189,985 | 2/1980 | Harris | 156/173 |

Primary Examiner—C. J. Husar
Assistant Examiner—Conrad Berman

[57] ABSTRACT

A shaft is machined with helical flats or grooves. A collar or nut having a low friction inner face fits the shaft whereby their relative axial movement effects their relative rotation. The collar or nut is a short section of a longer tube which has been formed on a mandrel with corresponding outer dimensions and includes a low friction inner face and an outer thermoset resin body having a helically wound glass filament reinforcing. A minimum winding angle is required because of manufacturing considerations and strength requirements. The profile of the flats or grooves of the mandrel and of the shaft is selected relative to the winding angle of the glass filaments so that the glass filaments are not required to span any reentrant portions in either direction of winding.

9 Claims, 10 Drawing Figures

ROTARY TO LINEAR ACTUATOR AND METHOD OF MAKING THE SAME

BACKGROUND OF THE INVENTION

In U.S. Pat. No. 2,953,418 a low friction sleeve bearing is provided by winding a single yarn back and forth around a mandrel a great many times. The yarn is of a heat shrinkable material and is first dipped in a resin which is dried before winding. The yarn of the innermost layers is principally of Teflon to provide the low friction face of the bearing. Winding a single yarn is a tedious process but the dried resin allows the winding to proceed with some speed. However, the finished bearing has very little resistance to crushing. That is, it has very low axial strength because the yarn has a near zero winding angle with the result that the yarn provides practically no reinforcing in the axial direction. Also, the predried resin may not fully fill the yarn in curing and will leave air gaps.

In U.S. Pat. No. 3,616,000 a low friction fabric sleeve is fitted on a mandrel and parallel roves of glass filaments form a tape which carries the liquid resin to the work. The tape is wound over the fabric in layers to form a composite of glass filaments and interstitial liquid resin. The resin is cured and hardens and the glass filaments provide the optimum balance of axial and circumferential reinforcing.

The winding tension is important in that the roves must press against the fabric placed on the mandrel and further conform the fabric to the mandrel and fill the fabric with resin. However, a problem is presented in attempting to make a bearing having an internal spline or threads. The mandrel then includes reentrant portions which the roves will span and unavoidably leave a "resin gap" having no reinforcement and possibly leave an air gap with no resin whatever. In U.S. Pat. No. 3,713,932 the fabric which is applied to the mandrel is shaped by first winding resin impregnated cords in the grooves to assure that the fabric is well conformed to the profile of the thread. This first step must be done with great care so that the teeth of the threads at least will be well filled with resin. A similar problem is presented in trying to provide a bearing for a linear actuator having, for example, a 30° pitch.

A most important object of the present invention is to provide for winding of the filament reinforcing across the grooves in both directions and without leaving any resin gaps in either direction. Another object is to conform the low friction lining material of the collar or nut with the grooves of the mandrel in the winding step. Another object of the present invention is to eliminate having to conform the fabric as in U.S. Pat. No. 3,713,932. Another object is to provide a linear actuator having a relatively large pitch angle. Another object is to improve the fit and support of the collar on the shaft so that the conversion of linear to rotary motion is effected with very little loss due to friction. Another object is to provide an actuator which can be of a relatively large diameter and statically support a large radial or axial load.

SUMMARY OF THE INVENTION

An actuator comprises an elongated inner member or screw having a spiral groove of uniform section and pitch and a complementary outer member. The inner member is of metal and machined; the outer member is of a wound glass filament reinforced thermoset resin construction with a low friction lining. The outer member comprises a section of a tube formed on a mandrel having the outer dimensions of the actuator. The pitch, the winding angle and the groove profile are such that all the roves of filaments as they are wound in each direction, i.e. in both directions, conform themselves to the mandrel, and so that there are no portions which are spanned by the filaments and which would later consist only of resin having no reinforcing. As the winding progresses, the outer form of the composite becomes more rounded and the reentrant angle increases to allow the winding angle to be increased. In general, the angle referred to has practical limits of in the order of 30 to 45 degrees.

The geometry of the groove is essentially a hyperboloid of revolution having an axial component. The hyperboloid of revolution is generated by a straight line having a fixed relation to the axis of its revolution. According to the present invention, the winding angle of the roves is not greater than the angularity of the straight line generatrix relative to a plane normal to the axis of revolution referred to. That is, the angularity of the generatrix is not less than the complement of the winding angle.

The inner low friction lining may be wound roves of composite materials or a woven fabric of such materials. The roves may comprise filaments of a low friction material such as a polytetraflouroethylene (example: DuPont Teflon synthetic polymer) and filaments of a bondable material (examples: cotton or DuPont Dacron synthetic fiber). The fabric may be woven of threads or yarns of the materials mentioned. U.S. Pat. No. 3,804,479 discloses a particularly suitable fabric of such materials.

GENERAL DESCRIPTION OF THE EMBODIMENT SHOWN IN THE DRAWINGS

Figure 1:
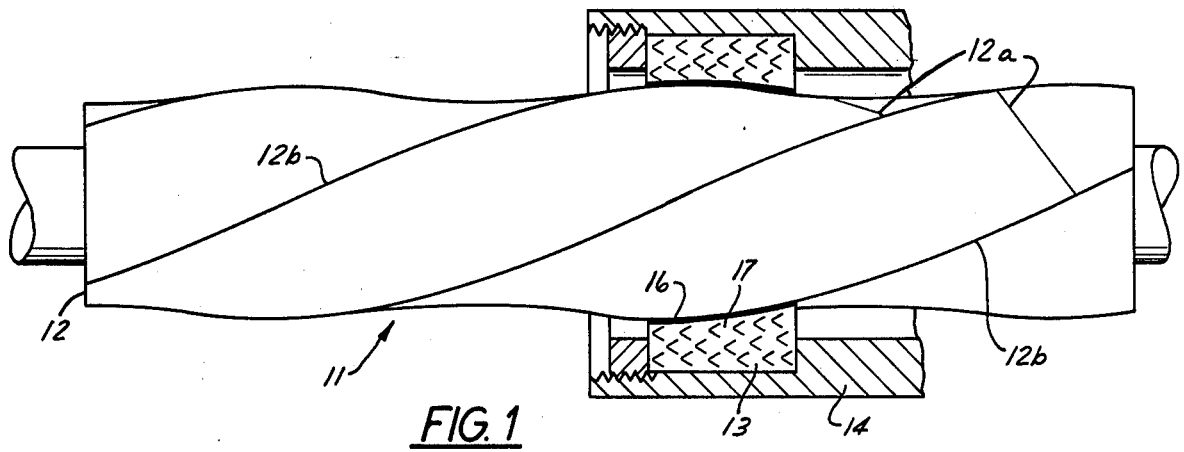
FIG. 1 shows the screw of an actuator in elevation. The nut which turns the screw and the member which carries the nut are axially sectioned. The steel screw has four machined flats forming helical grooves and the nut has a low friction fabric lining and a wound glass filament reinforced epoxy resin body.

The actuator 11 shown in FIG. 1 comprises the machined screw 12 and the nut 13. Either or both ends of screw 12 may be provided with means for its rotational support by a machine element not shown. The nut 13 is carried by the member 14 and fits the screw 12 so that axial movement of the nut effects rotation of the screw for whatever function the actuator is intended. Means to prevent rotation of the nut is not shown but is, of course, required. Screw 12 has four helical flats 12a and intermediate ridges 12b of nominal width.

The nut 13 has an inner fabric lining 16, an outer body of a hardened resin 17 and circumferential glass filaments 18 which reinforce the resin. The nut consists of a section of a rigid tube which is constructed on the mandrel 21 having outer dimensions corresponding with that of the screw 12.

Mandrel 21 has four machined helical flats 21a and intermediate ridges 21b and the ends of the mandrel are machined to fit the driving head 23 and tail stock 24 of the winding machine, not otherwise shown except as will be noted. Immediately prior to use, mandrel 21 is coated with a suitable parting agent.

The fabric lining 16 is woven in the form of a sleeve which is drawn over mandrel 21 and is preferably secured at each end with a band 28 to hold it in place. The fabric sleeve may be conformed to the mandrel as required and may be wetted with liquid resin prior to the winding step.

A number of parallel, contiguous roves 30 of glass filaments and the resin carried thereby form a tape 32. The roves are drawn from creels 33 and pass over the comb 34 in the usual manner. Typically, thirteen such roves comprise tape 32. For clarity, only three roves of the tape are shown.

Roves 30 may dip into a pan of resin, not shown, before passing through the winding ring 35 disposed above mandrel 21. Alternatively, as shown, roves 30 pass from comb 34 through the resin 36 carried in the cone 37 and through ring 35 which forms the lower end of the cone. Means, such as a loose plug, not shown, closes the lower end of cone 37 sufficiently to retain the resin 36 in the cone except for that which is carried past the plug by tape 32.

Comb 34 and cone 37 including ring 35 are supported by the reciprocating carriage 38 of the winding machine and means, not shown, to supply resin to cone 37 may also be supported by and move with carriage 38.

The starting end of the prepared tape 32 is first secured under the band 28 at the end of mandrel 21 so that the first winding course is of the same hand (left as shown) as are the grooves or flats 21a.

Tape 32 is wound by rotation of mandrel 21 and reciprocation of carriage 38 as is provided by the winding machine. The individual roves 30 should have a tension in the order of two to four pounds (0.9 to 1.8 kg). As the winding reverses at each end of mandrel 21, the overlying roves 30 form enlarged end sections which are later discarded.

Figure 4:
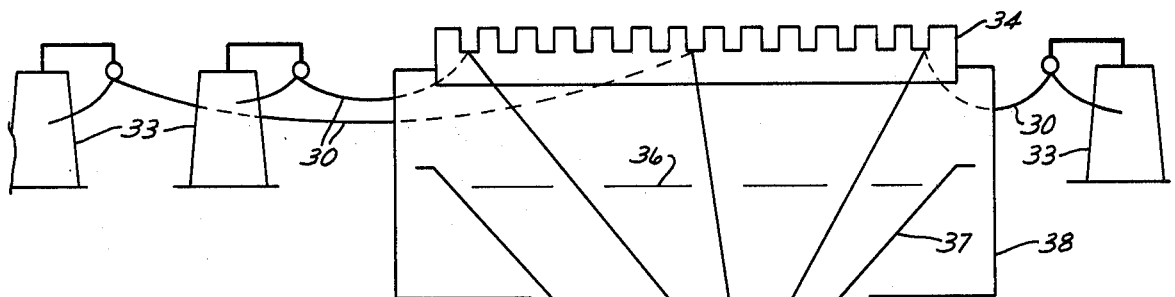
FIG. 4 shows schematically parts of the winding machine and a mandrel which corresponds with the screw of the actuator. The initial winding with the groove helix has been completed and the first return winding is partially completed.
Figure 5:
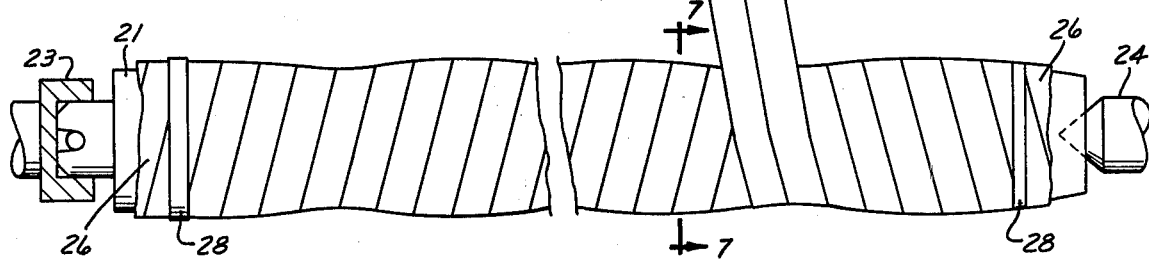
FIG. 5 shows the intermediate glass filament winding.
Figure 5:
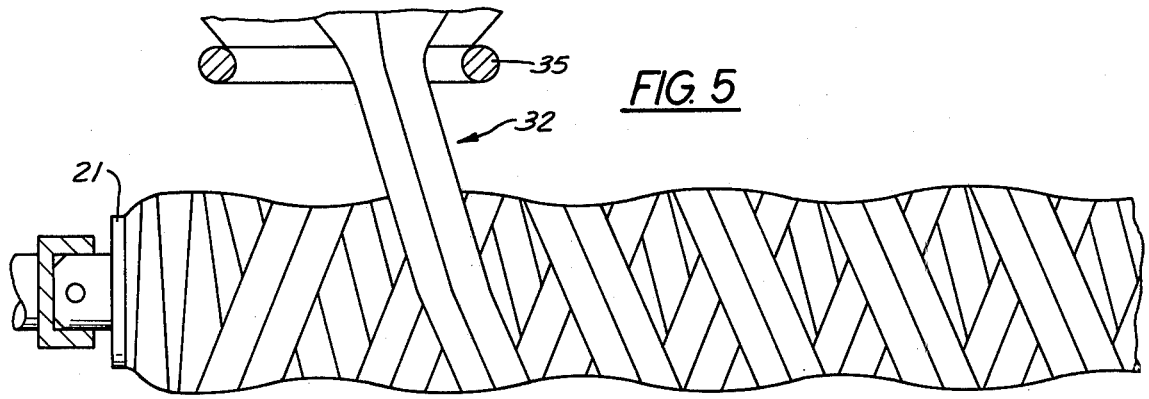
Figure 6:
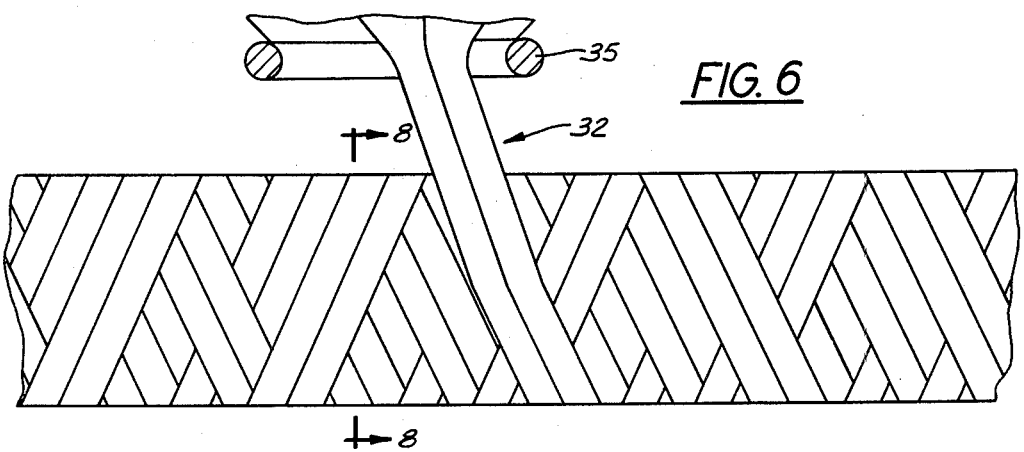
FIG. 6 shows the glass filament winding substantially completed. The epoxy resin is then heat cured in an oven. Thereafter the rigid tubular article is removed from the mandrel and cut to several shorter lengths to provide several nuts such as that shown in FIG. 1.

For convenience, the winding over the fabric sleeve will be described further with reference to the mandrel rather than to the fabric. The forward courses have the same hand or twist as the grooves or flats 21a and the reverse courses are of the opposite twist. Also, according to the invention as will be described, successive numbers of layers will have different pitches. Specifically as shown in FIG. 4, the first layers of tape 32 are applied so that each turn lies directly adjacent to the next turn and each course comprises a complete layer. In each course of the intermediate layers, as shown in FIG. 5, the tape is spaced a distance equal to its width and four courses complete a layer. Similarly, in each course of the outer layers as shown in FIG. 6, the tape is spaced a distance twice its width such that each complete layer consists of six such courses.

Figures 2, 7, 8:
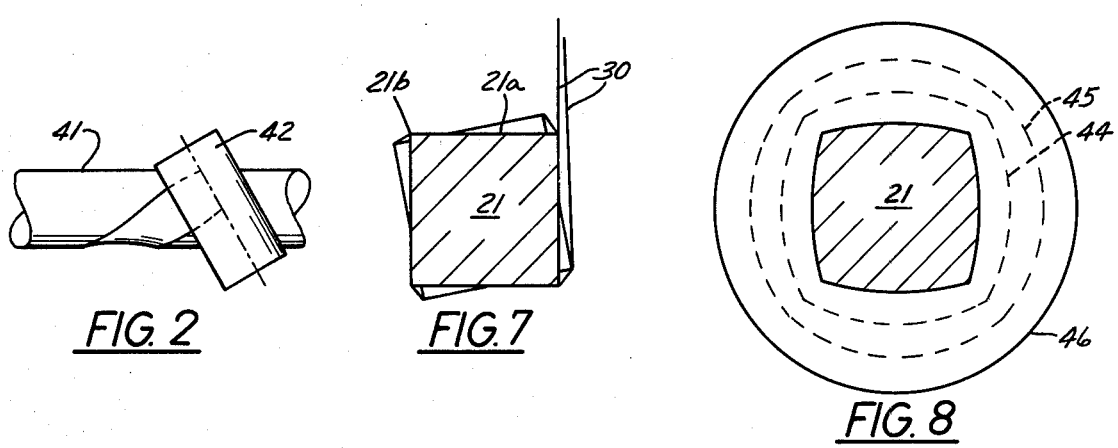
FIG. 2 is a line drawing showing the cylindrical piece which is machined to form the screw and the cylindrical cutter and its axis above the workpiece.
FIG. 7 is a section taken on line 7—7 of FIG. 4.
FIG. 8 is a section taken on line 8—8 of FIG. 6.

The first layers of tape 32 conform to the generally square section of mandrel 21 as shown in FIG. 7. However, as is known, the tension applied to the roves compact the filaments more tightly around the corners of the mandrel such that the successive layers first become somewhat rounded as is outlined by the broken line 44 in FIG. 8. Thereafter they are further rounded as shown by the broken line 45 and substantially rounded as shown by the full lines 46 which represent the roves carrying the resin to the works to form the outermost layers of the completed winding.

When the winding is completed, mandrel 21, with the composite consisting of the fabric sleeve to form lining 16, the wound filaments and the interstitial resin is placed in an oven, now shown and in which the resin is cured and hardness to form a rigid tube. The tube is removed endwise from mandrel 21 and the larger ends of the tube are cut off and discarded. The remaining section is machined to an outer cylindrical form and then is cut to intermediate lengths such as to provide the actuator nut 13.

The fabric sleeve may be of various constructions. A preferred low friction fabric is disclosed in U.S. Pat. No. 3,804,479. A braided sleeve may also be applied to mandrel 21 and generally conformed to the mandrel by pulling endwise to apply the requisite circumferential tension to the yarns of the sleeve. In some cases possibly, a fabric ribbon might be wound on the mandrel to provide the low friction facing of the actuator nut. Another alternate will be described hereinafter.

A number of epoxy resins are available for use. Generally, any of those used in the manufacture of plain sleeve bearings would be suitable here. While cotton or other yarns might be substituted for the glass filament roves, it is not believed that the advantage of the glass filaments can be equalled with any such substitution.

DETAILED DESCRIPTION OF THE INVENTION

The grooves or flats of the actuator screw and of the mandrel are contoured with respect to the winding angle of roves 30 so that the roves do not span the groove. The first step requires determining what the initial winding angle must be as determined by the width of tape 32 and the diameter of the mandrel including the fabric. An initial winding angle of ten degrees would be typical as shown where the screw and mandrel diameter is two inches (50.8 mm) and there are 14 roves of 60 filaments each such that the tape is about 1¼ inches (31.75 mm) wide.

Figure 3:
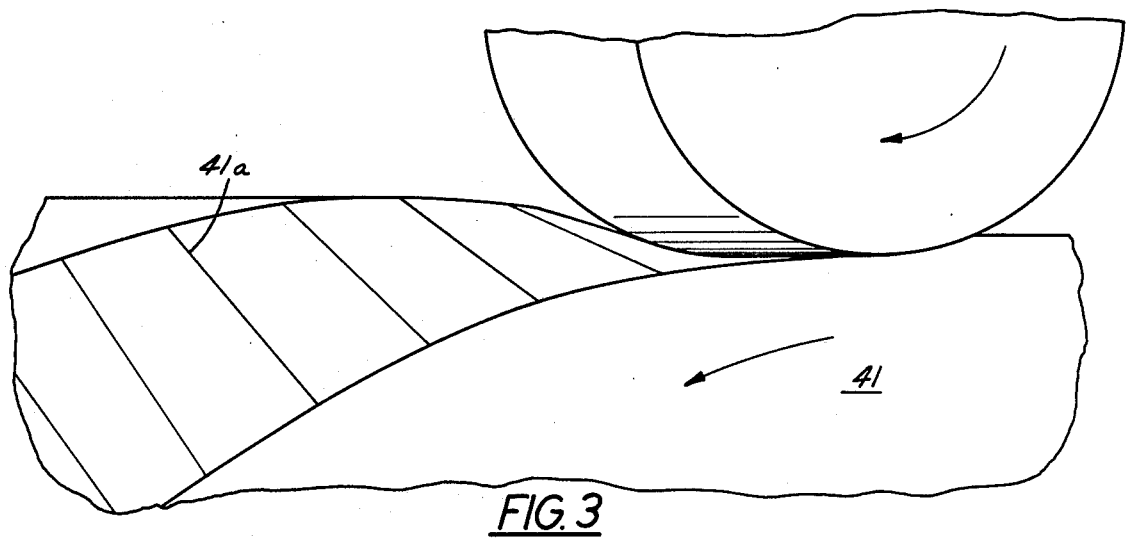
FIG. 3 is a line drawing showing the geometry of the machined helical grooves.

As shown in FIGS. 2 and 3, the round steel stock 41 moves axially and is rotated beneath the cylindrical cutter 42 to form each of the grooves or flats. This work is conventionally performed by a flute milling machine, not shown. In particular, the axis of cutter 42 is set angularly respecting the axis of the work so that each groove or flat has an essentially straight-line generatrix which is angularly related to the axis of the groove helix. (For convenience here, the angle between the straight line and the axis is measured with respect to a plane normal to the axis referred to.)

The angle may be conveniently called the reentrant angle for the reason that any line across the groove at a greater angle will span the groove while any line at a lesser angle will be arched outwardly or convex. Thus the lines 41a in FIG. 3 and lines 12a in FIG. 1 are such essentially straight lines. Other lines, not shown, and drawn at any greater angle across the flats are concave and those drawn at a lesser angle are convex. The individual roves 30 of the first layers are laid across the flats either at the angle referred to or at a lesser angle. Similar limits apply to the forward course of winding, that is with the helix of the tape having the same direction or with the same hand or twist as that of the grooves or flats. However, such limits are always greater and need not be given consideration.

After a number of first layers are completed as in FIG. 4, their outer configuration is somewhat rounded as has been mentioned such that the reentrant angle of the composite is increased and the winding machine then may be set to wind tape 32 as in FIG. 5. As the outer form of the wound composite further approaches a circular section, the reentrant angle of the composite is further increased to such degree that the outermost layers of tape 32 may then be wound as shown in FIG. 6. Winding as in FIG. 6 is essential to the strength of the actuator nut 13 because the winding angle has the large axial component to provide the required axial reinforcement.

It should be noted again that the manner of winding is always the same in both directions to provide the actuator nut 13. Actuators of other than four sides and of other pitches and of other sizes may also be made using the present invention. In particular, an actuator of a diameter up to the limit of the winding machine can be provided. Such actuators may have any number of grooves, although at least two grooves and preferably three grooves are thought to be required as that a suitable balance of the axial and radical forces are assured.

Figure 9:
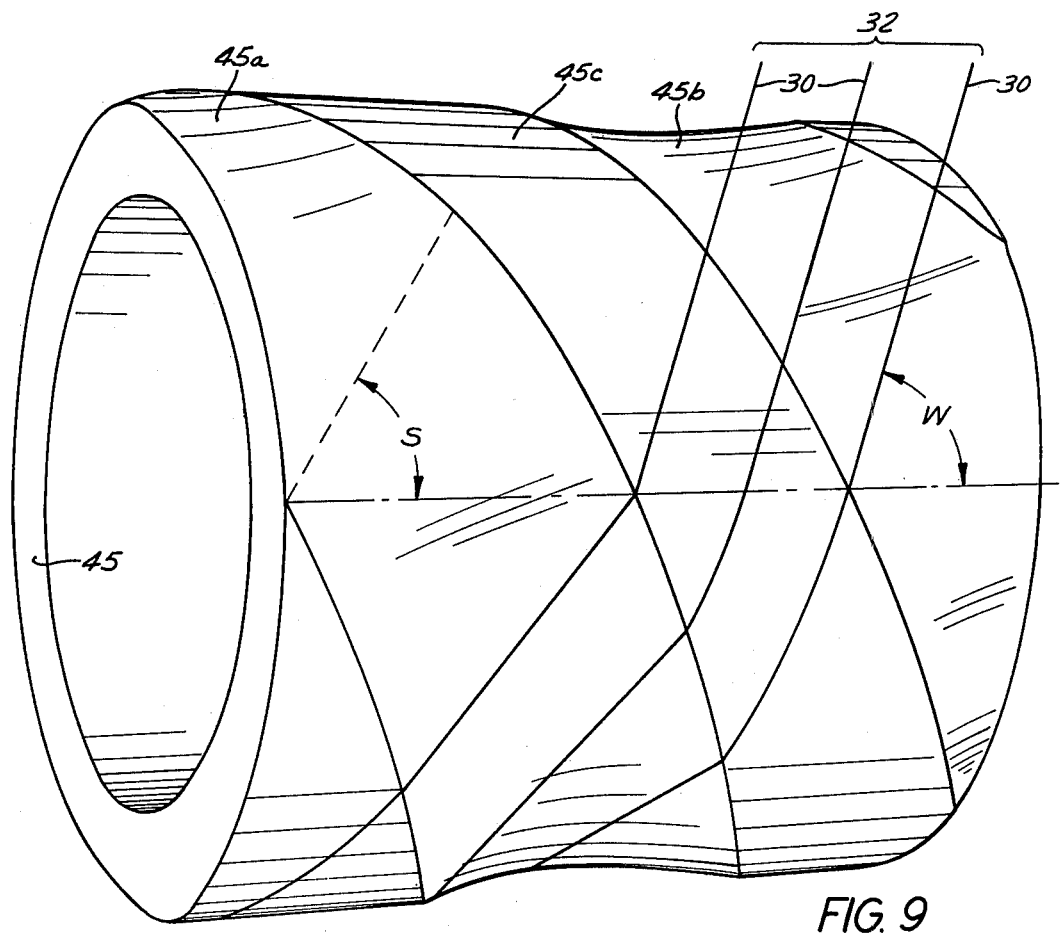
FIG. 9 is a perspective view of a portion of a mandrel for making the collar of a relatively large actuator.

The mandrel 45 shown in FIG. 9 corresponding with the screw of such an actuator and includes the grooves 45a and 45b and the intermediate cylindrical surfaces 45c.

A fabric sleeve such as to form lining 16 except of a larger size, is applied to the mandrel and can be readily made to conform to the mandrel as previously described. For convenience, the sleeve is not shown in FIG. 9 and the grooves of the mandrel will be referred to instead of the grooves of the screw. The roves 30 forming the tape 32 are applied to mandrel 45 in the same manner as previously described. The two grooves at 180° of each other provide the load balance which has been mentioned and are machined in the manner illustrated in FIG. 2. As a typical example, the mandrel is of 3½ inches (88.9 mm) outer diameter; the grooves are about 1½ inches (38.1 mm) wide, one inch (25.4 mm) apart, about ⅜ inches (9.5 mm) deep and have a pitch equal to two diameters. The broken line indicates a straight line across the surface of a groove. The angle S is the complement of the reentrant angle which has been described. The angle W is the complement of the winding angle of the roves 30. The winding angle is not greater than the reentrant angle referred to.

As shown in FIG. 9, the individual roves 30 of tape 32 which cross the surfaces 45c of the mandrel have an unmodified helical direction whereas the portions of roves 30 which lie across the groove 45a follow a path which is curved outwardly at least to some extent. To the extent referred to, it is assured that the roves do not span any portion of the grooves. In any case, including if the roves are placed flat against the mandrel and are straight, the succeeding spiral in the opposite direction will press the roves against the sleeve or the roves over which they are wound.

Figure 10:
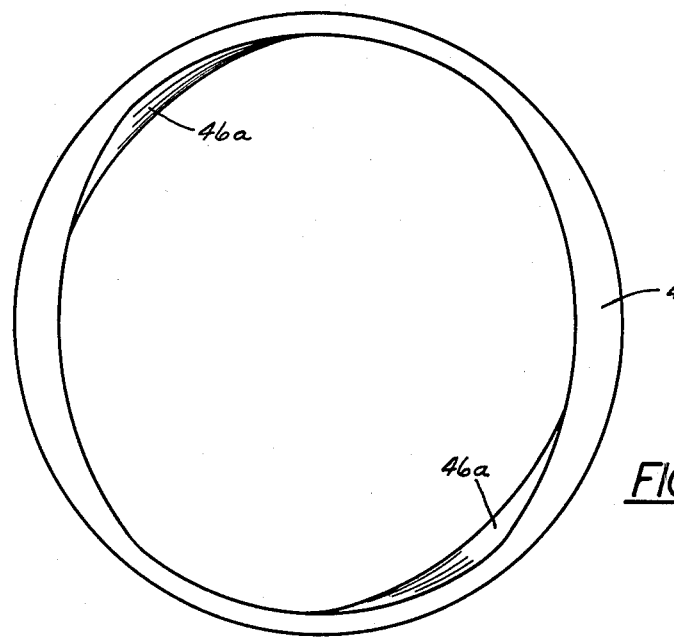
FIG. 10 is an end view of the completed actuator collar which is to be secured in a rigid housing and against rotation such as with a key, not shown.

The tape 32 is wound over mandrel 45 in the same manner as that described with reference to FIGS. 1–8. Upon completion, the rigid tube is cut into lengths which are each in the order of one to two inches (2.5 cm to 5 cm) in axial length. Each such length comprises an actuator collar which corresponds in function with nut 13. As shown in FIG. 10, the outer dimension of collar 46 is cylindrical and the inner surface is formed by the sleeve which was fitted on the mandrel before winding. This surface includes the opposite helical surfaces 46a fit the grooves of the screw, not shown, which correspond with grooves 45a of the mandrel. With their relative rotation, their interaction provides their relative axial movement. The "flat" bearing surfaces 46b which are intermediate the surfaces 46a provide the radial support of the screw and collar 46 relative to each other or their supporting structure.

The collar 46 is capable of operating under extremely high loads without distortion because of the well placed glass filament reinforcing. The collar or screw will not readily bind or jamb. The low friction material which may be utilized with maximum effectiveness can allow the actuator to operate at very slow rotational speeds without sticking.

DESCRIPTION OF AN ALTERNATE EMBODIMENT

In an alternate embodiment of the invention, the low friction lining 16 of nut 13 and the collar 46 may comprise a wound layer of yarns of filaments of low friction material. One or several such layers may be applied before being overlaid with the glass filament reinforcing. While a single yarn may be applied as in U.S. Pat. No. 2,953,418, the present invention allows for simultaneously winding a number of contiguous parallel roves to carry the liquid resin from the cone 37 to the mandrel as in winding the glass filament roves. With reference to FIG. 4, the initial roves 26 of low friction material are shown applied to mandrel 21. Their ends are secured by the bands 28 and the Figure shows the glass filament roves being applied thereover. All of the succeeding steps in the manufacture of the nut 13 and of the collar 46 are the same as have been described.

I claim:

1. A rotary-to-linear actuator which includes a rigid shaft and a low friction material lined filament reinforced resin collar, the shaft having a helical groove, the collar having a corresponding spiral ridge, said helical groove being of the form generated by a straight line of fixed angularity respecting a plane normal to the helix axis, the fixed angle referred to being between 30 and 45 degrees, the reinforcing of the collar comprising successive layers of parallel filaments helically wound over and around the low friction material, the first layers which form the inner layers of the collar being wound at an angle not greater than said fixed angle such that the filaments lie across the projecting face of the spiral ridge and do not span the groove whereby the low friction material is directly supported against the outer dimensions of the shaft.

2. The actuator of claim 1 wherein the reinforcing filaments of the collar are alternately wound in opposite helical directions.

3. The actuator of claim 2 wherein each layer of reinforcing filaments includes helically wound parallel glass filament roves.

4. The actuator of claim 1 wherein the low friction material of the collar comprises a woven fabric including threads of a material with which the resin is readily bondable.

5. The actuator of claim 4 wherein the low friction material of the woven fabric is a polytetrafluoroethylene thermoplastic resin.

6. The method of making a linear actuator which includes a rigid rotatable shaft and a low friction material lined filament reinforced resin collar which is axially movable on the shaft which method includes providing a rotatable mandrel with a helical groove of the form generated by a straight line of fixed angularity respecting a plane normal to the mandrel axis, the fixed angle referred to being between 30 and 45 degrees, applying the low friction material to the mandrel, thereafter in successive layers winding a resin-carrying tape of parallel filaments under tension over and around the material on the mandrel, the first layers applied to the mandrel being wound at an angle not greater than said fixed angle such that said filaments lie across the indented face of the groove with no bridging whatever and whereby the low friction material is closely conformed with the outer dimensions of the mandrel and the shaft, thereafter causing said resin to harden to form a number of such collars in series, separating said collars, providing a shaft of the same outer dimensions as the mandrel, and assembling one such collar on said shaft.

7. The method of claim 6 wherein the first layer is wound in the helical direction of the groove whereby the tension of the filaments forces the material entirely against the mandrel including in particular against the indented face of the groove.

8. The method of claim 7 wherein each of the first layers is wound in a single pass, that is, with no overlapping.

9. The method of claim 8 which includes winding each of the outer layers at angles greater than those of the first layers and with overlapping of the tape in each layer.

* * * * *